United States Patent [19]

Bye et al.

[11] Patent Number: 4,741,776

[45] Date of Patent: May 3, 1988

[54] METHOD OF PROCESSING WASTE MATERIALS

[75] Inventors: Gerald C. Bye, Gravesend; Kenneth B. Matthews, Swanscombe, both of England

[73] Assignee: Blue Circle Industries Limited, London, England

[21] Appl. No.: 761,326

[22] PCT Filed: Sep. 11, 1981

[86] PCT No.: PCT/GB81/00187

§ 371 Date: May 6, 1982

§ 102(e) Date: May 6, 1982

[87] PCT Pub. No.: WO82/00998

PCT Pub. Date: Apr. 1, 1982

Related U.S. Application Data

[63] Continuation of Ser. No. 377,266, May 6, 1982, abandoned.

[30] Foreign Application Priority Data

Sep. 19, 1980 [GB] United Kingdom ............... 8030377

[51] Int. Cl.$^4$ ............................ C21F 9/00; C04B 7/02; C04B 7/14; C04B 7/34
[52] U.S. Cl. ........................................ 106/89; 106/97; 106/109; 106/117; 106/118; 106/120; 404/76; 405/129; 423/DIG. 2
[58] Field of Search .................... 106/89, 97, 109, 110, 106/111, 118, 120; 404/75, 76; 405/128, 129; 423/DIG. 2

[56] References Cited

U.S. PATENT DOCUMENTS

| | | | |
|---|---|---|---|
| 4,028,130 | 6/1977 | Webster | 405/129 |
| 4,028,217 | 6/1977 | Anderson et al. | 106/97 |
| 4,049,462 | 9/1977 | Locozza | 106/110 |
| 4,101,332 | 7/1978 | Nicholson | 106/97 |
| 4,116,705 | 9/1978 | Chappell | 106/97 |
| 4,118,243 | 10/1978 | Sandesara | 106/109 |
| 4,256,504 | 3/1981 | Dunstan, Jr. | 106/110 |
| 4,274,880 | 6/1981 | Chappell | 106/97 |
| 4,338,134 | 7/1982 | Zu Munster | 106/97 |
| 4,375,986 | 3/1983 | Pichat | 106/97 |
| 4,432,666 | 2/1984 | Frey et al. | 106/90 |

FOREIGN PATENT DOCUMENTS

1485625 11/1977 United Kingdom .
1518024 7/1978 United Kingdom .
2016438 9/1979 United Kingdom .

OTHER PUBLICATIONS

Hoak et al., Pickle Liquor Neutralization, T&EC, vol. 40, Nov. 48, pp. 2062-2067.

*Primary Examiner*—Gary P. Straub
*Attorney, Agent, or Firm*—Brooks Haidt Haffner & Delahunty

[57] ABSTRACT

A method of processing waste material comprises treating the material with flue dust and bonding it to form a solid mass with cement powder, e.g. Portland cement. Acidic liquors containing heavy metals can be processed. Suitable flue dust is obtained from cement manufacture.

9 Claims, No Drawings

METHOD OF PROCESSING WASTE MATERIALS

This application is a continuation of application Ser. No. 377,266, filed May 6, 1982, now abandoned.

The present invention relates to a method of processing waste materials, for example hazardous waste materials.

Processes are known wherein wastes are converted into a solid mass or aggregate by treatment with a silicate and a cementitious material in the presence of water. The product may then be used for land-filling in appropriate sites. Thus, for example, GB-PS No. 1,485,625 discloses a process for treating a hazardous waste capable of being contained in an aqueous slurry, which process comprises adding a calcium-containing cement powder and a powder consisting of aluminium silicate and/or an aluminosilicate to the waste dissolved or dispersed in water, thereby forming a flowable slurry containing the waste and allowing the slurry to set into a rigid, rock-like mass. The preferred aluminosilicate is fly ash, which is a finely divided residue carried off with exhaust gases produced by the combustion of pulverised coal.

GB-PS No. 1,518,024 discloses a process for the treatment of toxic waste, which process comprises obtaining a low-molecular-weight silicic acid from a silicate (e.g. blast furnace slag or fly ash) by means of an acid, mixing the silicic acid with the waste in the presence of water and in a sufficiently acid medium to ensure at least partial dissolution of the waste, precipitating a gel from the aqueous mixture and hardening it to give a solid aggregate. A material, e.g. lime, that reacts with the gel to form a silicate may be added, as may a cementitious agent, e.g. Portland cement.

However, owing to the continuing pressure to dispose of large quantities of industrial waste with the minimum possible pollution of the environment, there is a need for a process that converts wastes into a solid form which has a lower leachability, especially with regard to toxic heavy metals, than has been achieved hitherto. Furthermore, in view of the desirability of putting to use quickly the sites filled with the converted waste, there is a need for a process that gives a product of rapid strength development and of good final strength.

The present invention now provides a method of processing a waste material in which said waste material is bonded with cement powder to form a solid material, characterised in that the waste material is also treated with flue dust.

A preferred flue dust is that obtained from the flue gases in the manufacture of cement. Various devices, for example precipitators and/or cyclones can be used to collect this flue dust. Such flue dust is predominantly a calcium carbonate and its oxide analysis may give up to 60% for calcium oxide, CaO. Commonly, the content of alumina will be only about 3-3.5%. By virtue of its CaO analysis value, the flue dust can be regarded as a basic or alkaline material.

The oxide analysis of dust, from the precipitators or cyclones of a cement works typically gives figures for the major components within the following ranges:
$SiO_2$: 9.2–18.4%
$Al_2O_3$: 3.0–7.4%
$Fe_2O_3$: 1.4–3.3%
$P_2O_5$: 0.05–0.22%
$TiO_2$: 0.13–0.22%
CaO: 17.7–51.0%, usually at least 35%.
MgO: 0.4–1.7%
$SO_3$: 3.8–20.3%
$K_2O$: 1.9–9.7%
$Na_2O$: 0.1–1.1%
Cl: 0.1–6.8%
Loss on ignition: 7.2–27.9%

The flue dust need not normally be fractionated before use. Moreover, the flue dust need not be taken directly from the collecting means: it is possible to use material taken from stored or dumped deposits of flue dust.

The method of the present invention can be employed for the treatment of diverse waste materials, including toxic and other hazardous wastes. The invention is particularly advantageous in the treatment of waste materials, e.g. inorganic wastes, that are acidic and/or that contain one or more heavy metals (such as chromium, lead, mercury, cadmium, arsenic, iron, tin, zinc, nickel, copper, cobalt, vanadium, manganese or barium).

Waste materials treated by the present process are conveniently liquid, e.g. aqueous suspensions or solutions. However, a waste normally obtained in solid form or as a sludge can be mixed with water prior to or during the present process.

Typical wastes that can be treated by the present process include, for example, spent inorganic catalysts from the petrochemical, dyestuff or other chemical industries; mine tailings and drosses; wastes from the iron and steel and the non-ferrous metals industries, e.g. pickling bath liquors; electroplating and metal-finishing wastes, e.g. acidic plating liquors; wastes from the production of electric batteries; and smelting and metal-refining wastes.

As mentioned above, the waste material is treated with cement powder; this may be, for example, Portland cement and in particular ordinary Portland cement (OPC). Of course, other cementitious materials could in principle, be used. The cement powder will generally have a fineness corresponding to a specific surface of 200 to 700 $m^2$/kg, but this is not regarded as an essential feature of the invention.

Furthermore, additional neutralising agent, for example lime (calcium oxide or calcium hydroxide), can be employed, if required. Moreover, other fine particulate material, suitable as a filler with cement, can be used to supplement the flue dust employed in the present invention.

A preferred way of putting the present invention into practice is as follows:

In a first step, the flue dust is admixed to the waste material. The waste material, as indicated above, can be various physical forms, for instance a liquid, a slurry or a finely divided solid. If appropriate, water or some other liquid may be incorporated in order to improve mixing. This step can be effected in any appropriate apparatus, e.g. a conventional concrete mixer.

In a second step, when the mixture is substantially neutral, that is at pH 6-8 (which may be indicated by the cessation of effervescence or by appropriate pH measurement), cement powder is added, if appropriate in the presence of additional water for gauging. It has been found advantageous to add the cement powder at this early stage in order to obtain a good dispersion thereof in the mixture (and hence obtain better strength characteristics in the final solid mass).

In some cases, it has been found advantageous to add, in a third step, a particulate material, for example more flue dust and/or fly ash, in order to increase the solids content.

In a subsequent step, the thick flowable slurry obtained from the preceding steps is allowed to harden to a solid mass. This may take up to 3 or 4 days, after which it may have sufficient strength to take foot traffic (this requiring a strength of, in general, 1380–2070 kPa).

The sequence of steps just described can, of course, be modified according to the waste material to be treated. Thus one possibility is to replace, partially or wholly, the flue dust in step 1 by a neutralising agent (e.g. alkaline waste or caustic soda), the flue dust being added subsequently (for example together with the cement powder in step 2, or later, in step 3).

This embodiment is useful if the product from step 1 has to be pumped, for instance to a site where the treated waste will be allowed to harden in situ, such as in a quarry, for land-filling purposes. The neutralising agent can be selected to obtain the requisite flow characteristics of the mixture.

The optimum amount of the various materials, such as flue dust and cement powder, will vary from case to case, depending upon the nature of the waste material being treated. Appropriate amounts can be determined by the skilled person very readily. In a number of cases, for example, the appropriate weight ratio of flue dust to waste material will be 1:2 to 1:1. Thus, it may be appropriate to use an amount of flue dust equal (by weight) to the amount of the waste material being treated.

The solid material obtained by the method of the present invention in general has only a low "leachability". Thus, for example, only very low levels of toxic material, for example heavy metals or anions such as phosphate or fluoride (which anions will be fixed as insoluble calcium salts), will be leached out even on prolonged contact of the solid material with water. Thus, the solid material obtained by the present method can be used in landfilling and in land reclamation.

The solid product, since it traps toxic metals within a low-permeability matrix, would allow sites (e.g. old chalk quarries) previously unsuitable for receipt of hazardous waste owing to geological considerations, to be filled and returned to agriculture, community space or even building. The product has no odour, does not burn and is unattractive to birds and vermin.

The present invention is illustrated in and by the following examples:

EXAMPLE 1

A liquid toxic waste (an aqueous, acidic plating liquor), designated "Waste A", was employed; this material had a pH of 2.5, the total acidity measured as $H_2SO_4$ being 209 g/l. This waste also contained a number of heavy metals (see Table 1 below).

Flue dust was added to 500 g of Waste A until the resulting slurry had a pH of about 7 (as indicated by the cessation of effervescence). At this point, 83 g of OPC were added. More flue dust was then mixed into the slurry to give a total addition of flue dust of 750 g. This slurry hardened within 48 hours. The resulting solid exhibited a 7-day strength of 2770 kPa and a 28-day strength of 4300 kPa.

The fixation of the toxic elements was examined using the equilibrium leaching test. In this test, 10 g of the solid material are ground to a fine powder, which is then mixed with 100 ml of distilled water. The mixture is stirred for 1 hour at 20° C. and then filtered through a Whatman (trade mark) No. 1 filter paper. The filtrate is then analysed by conventional techniques for the presence of heavy metals.

The results are given in Table 1 below, the values for the solid product being those measured after 7 days:

TABLE 1

| Element | Original Sample (ppm) | From Solid Product (ppm) |
| --- | --- | --- |
| Ni | 1350 | <0.01 |
| Fe | 60 | 0.09 |
| Zn | 9000 | <0.01 |
| Cu | 2500 | 0.03 |
| Cd | 3000 | <0.01 |
| Cr | 760 | 0.03 |
| Pb | 21 | 0.06 |

COMPARATIVE EXAMPLE 1A 500 g of Waste A were mixed with 83 g of OPC and to the resultant mixture were added 500 g of a lime waste, containing 98% calcium carbonate, and 250 g of an aluminosilicate. The slurry hardened within 48 hours to give a product that exhibited a 7-day compressive strength of 614 kPa and a 28-day strength of 1470 kPa.

It will be seen that the solid product according to the present invention exhibited higher strengths than this comparison product.

EXAMPLE 2

A conventional concrete mixer with a 6 $m^3$ working volume was employed, which mixer was fitted with an open topped hopper for loading and a discharge chute running into a waste skip.

A titration was made to determine the alkalinity of the cement flue dust supplied (actually a cement precipitator dust from Blue Circle Industries Limited's works in Northfleet, U.K.) and the amount of flue dust required to neutralise 3 tonnes of the acid waste selected was placed in the mixer. The dust was supplied in 1 $m^3$ bags having polythene liners and each holding about 0.5 tonne of flue dust. (On full scale use, delivery of dust in bulk to silos on site would be an alternative).

Following the flue dust addition, an acid waste (an aqueous, acidic plating liquor) was run into the mixer from holding tanks via a purpose-built pipeline. The mixer was turned throughout this operation.

Once the acid had been added the pH of the mixture was measured to ensure that it was in the pH 6–8 range. At this point cement (OPC) was added at a rate of 150–175 kg/tonne waste.

The resultant slurry was then mixed at high speed for 10–15 minutes to ensure good dispersion of the cement and to break down any lumps that may have been formed.

Three batches were treated according to this invention. In all three cases it was found that a thick but free-flowing slurry was produced at this point and no further addition of flue dust, to act as filler, was required. The slurry was discharged into skips and allowed to stand for 24–72 hours. All three batches would take foot traffic after 72 hours and developed 7-day strengths of 1660, 1790 and 1450 kPa respectively.

The three batches of the toxic plating acid were tested by the equilibrium leaching test 10 days after the above-described treatment according to the invention. The results are given below:

TABLE 2

|  | Ni | Cu | Cr | Cd | Zn | Pb | Fe |
|---|---|---|---|---|---|---|---|
| Batch 1 | | | | | | | |
| Untreated (ppm) | 32 | 23 | 71 | 14 | 82000 | 185 | 34000 |
| Treated (ppm) | 0.16 | 0.07 | 0.08 | 0.05 | 0.06 | <0.01 | 0.2 |
| Batch 2 | | | | | | | |
| Untreated (ppm) | 47 | 39 | 3140 | 8 | 83000 | 342 | 14000 |
| Treated (ppm) | 0.06 | 0.06 | 0.01 | 0.04 | 0.06 | <0.01 | 0.23 |
| Batch 3 | | | | | | | |
| Untreated (ppm) | 29 | 56 | 890 | 9 | 74000 | 197 | 29000 |
| Treated (ppm) | 0.14 | 0.07 | 0.12 | 0.07 | 0.10 | <0.01 | 0.26 |
| Batch 1 was left for a further 10 days and tested again by the same method. | | | | | | | |
| Batch 1, (after further 10 days) | | | | | | | |
| Treated (ppm) | 0.09 | 0.05 | 0.04 | 0.01 | 0.02 | <0.01 | 0.03 |

COMPARATIVE EXAMPLE 2A

Batches of acidic plating liquor of similar composition to the liquors treated in Example 2 were converted into solid aggregates by a process according to GB-PS No. 1,518,024. The resultant aggregates were investigated and the results for the equilibrium leaching test are given below (figures are in ppm):

TABLE 3

| Batch | Ni | Cu | Cr | Cd | Zn | Pb | Fe |
|---|---|---|---|---|---|---|---|
| I | 0.29 | 0.07 | 0.13 | 0.08 | 0.15 | 0.01 | 0.39 |
| II | 0.27 | 0.09 | 0.08 | 0.09 | 0.09 | 0.01 | 0.43 |
| III | 0.07 | 0.01 | 0.01 | 0.01 | 0.02 | 0.01 | 0.02 |
| IV | 0.18 | 0.06 | 0.08 | 0.04 | 0.08 | 0.01 | 0.28 |
| V | 0.22 | 0.12 | 13.40 | 0.07 | 0.17 | 0.01 | 0.38 |
| VI | 0.29 | 0.10 | 0.07 | 0.06 | 0.10 | 0.01 | 0.32 |
| VII | 0.22 | 0.09 | 0.06 | 0.06 | 0.09 | 0.01 | 0.40 |
| VIII | 0.25 | 0.11 | 0.15 | 0.06 | 0.23 | 0.01 | 0.38 |
| IX | 0.14 | 0.06 | 0.09 | 0.04 | 0.02 | 0.01 | 0.18 |

The trials described in Examples 2 and 2A indicated that the process of the present invention has the following advantages.

(i) Effectiveness in the leaching tests—The present invention gave results that are better on average than the results obtained according to the prior art. (It is worth mentioning that the tests are conducted using finely ground material. The leaching-out of metals from the solid mass as initially obtained is lower).

(ii) Ease of operation—A simple titration is all that is required to determine the amount of flue dust required for neutralisation. In practice, a simple determination of the buffering action of the metals present would also be effected in order, to indicate the amount of additional flue dust or cement required to keep the pH above 10 to ensure the insolubilisation of the metals.

(iii) Consistency—In the three batches mixed according to this invention, it was found that the amount of flue dust added for neutralisation gave a well-flowing product and no further addition was necessary. This seems to reduce the amount of material for ultimate disposal and to preserve flue dust.

(iv) Strength development—The products obtained by this invention hardened more rapidly than the prior-art aggregates and were able to take foot traffic in only 48-72 hours.

We claim:

1. A method of processing a waste material that is an aqueous acidic liquor containing one or more heavy metals, which method comprises the steps of (1) adding to the waste material an amount of flue dust, obtained from the manufacture of cement, that is sufficient to bring the waste material to a pH of from 6 to 8, said flue dust comprising calcium carbonate and having a CaO analysis value of at least 17.7% by weight, (2) thereafter mixing the waste material with an amount of cement powder effective to bond the waste material and (3) allowing the resultant mixture to harden to a solid material.

2. A method according to claim 1, in which the flue dust has a CaO analysis value of at least 35% by weight.

3. A method according to claim 1 or 2, in which the cement powder is Portland cement powder.

4. A method according to claim 1 or 2, in which the said waste is substantially inorganic.

5. A method according to claim 1, in which a basic material is added to the waste material in addition to the flue dust.

6. A method according to claim 5, in which the said basic material is selected from lime, caustic soda and alkaline wastes.

7. A method according to claim 1, in which a further amount of said flue dust is added to the waste material after the addition of the cement powder.

8. A method according to claim 1, in which a further particulate solid is added to the waste material after the addition of the cement powder.

9. A method according to claim 8, in which the said further particulate solid is fly ash.

* * * * *

UNITED STATES PATENT AND TRADEMARK OFFICE
CERTIFICATE OF CORRECTION

PATENT NO. : 4,741,776
DATED : May 3, 1988
INVENTOR(S) : Gerald C. Bye et al.

It is certified that error appears in the above-identified patent and that said Letters Patent is hereby corrected as shown below:

Col. 3, line 19, "in situ" should be underlined.

Signed and Sealed this

Fourth Day of October, 1988

Attest:

DONALD J. QUIGG

*Attesting Officer*    *Commissioner of Patents and Trademarks*